United States Patent [19]

Möltgen

[11] 4,009,433
[45] Feb. 22, 1977

[54] METHOD AND APPARATUS FOR COMPENSATING REACTIVE POWER

[75] Inventor: Gottfried Möltgen, Erlangen, Germany

[73] Assignee: Siemens Aktiengesellschaft, Munich, Germany

[22] Filed: Nov. 12, 1975

[21] Appl. No.: 630,948

[30] Foreign Application Priority Data

Nov. 18, 1974 Germany .................. 2454651

[52] U.S. Cl. ........................... 323/102; 323/127
[51] Int. Cl.² ................. H02J 3/18; G05F 1/68
[58] Field of Search ......... 323/101, 102, 106, 109, 323/119, 123, 127; 321/19, 27 R

[56] References Cited
UNITED STATES PATENTS

| | | | |
|---|---|---|---|
| 3,422,338 | 1/1969 | Philipps | 321/27 R |
| 3,740,638 | 6/1973 | Thorborg | 323/119 |
| 3,768,001 | 10/1973 | Thorborg | 323/119 |
| 3,829,759 | 8/1974 | Thorborg | 323/119 |
| 3,900,792 | 8/1975 | Möltgen | 323/102 |

*Primary Examiner*—William H. Beha, Jr.
*Attorney, Agent, or Firm*—Kenyon & Kenyon Reilly Carr & Chapin

[57] ABSTRACT

An arrangement for compensating reactive power in a three phase network using two converters with the same no load d-c voltage in which the two converters are coupled in parallel on the d-c side and shorted by a common choke with the one converter operated with a delayed firing time and the other with an advanced firing time and a d-c current in the choke regulated to a constant value by influencing the firing angles of the two converters in opposite directions.

5 Claims, 5 Drawing Figures

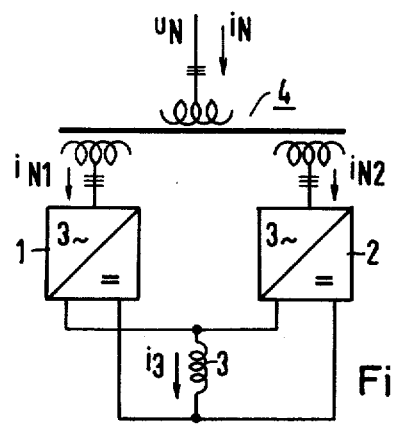
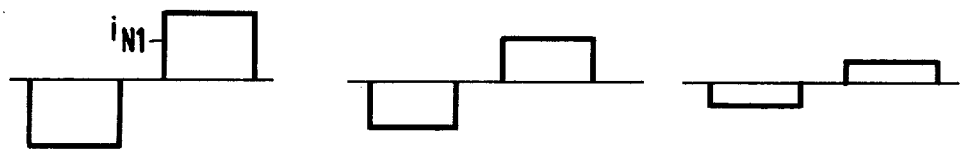
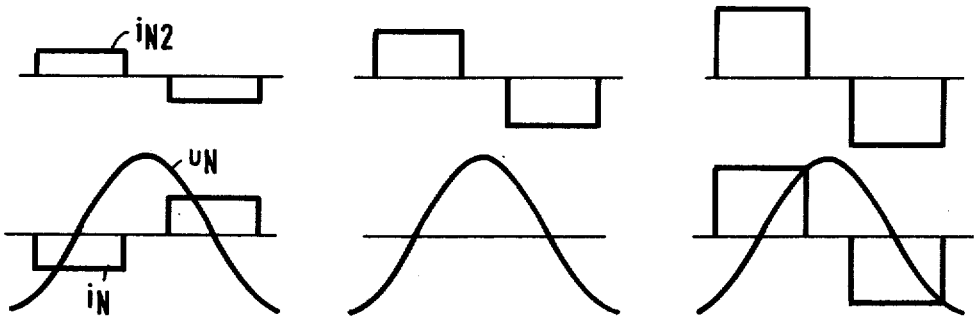
Fig. 2a     Fig. 2b     Fig. 2c
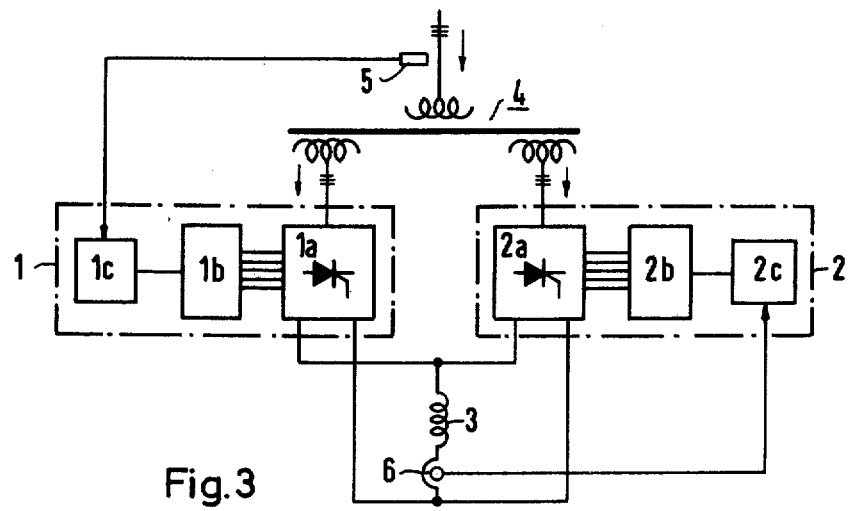
Fig. 3

6,009,433

METHOD AND APPARATUS FOR COMPENSATING REACTIVE POWER

BACKGROUND OF THE INVENTION

This invention relates to apparatus for compensating reactive power in a three phase network in general and more particularly to a method and apparatus for carrying out such compensation using two converters.

Line commutated thyristor converters are well known in the art. Such converters are described in detail, for example, in the book "Line Commutated Thyristor Converters" by G. Moltgen [Siemens AG and Pitman, 1972] and in the book Thyristor Phase-Controlled Converters and Cycloconverters by B. R. Pelli [Wiley — Inter-science, 1971]. Line commutated short-circuited converters have been used as reactive load converters. A converter of this nature having controlled rectifier branches which can be fired and extinguished can operate with a firing delay of approximately +90° to present an inductive reactive load and with an advanced firing point of approximately 90° to act as a capacitive reactive load. However, in the transition between presenting an inductive reactive load and a capacitive, reactive load, the entire range of active loads must be traversed continuously. This is given by the range of the firing angles between the two firing angle limits mentioned above. The d-c current when making such a traverse increases so fast that a converter which is short circuited through a choke cannot be considered as a universally usable reactive load converter. A further problem is presented by the fact that where choke filtering of the d-c current is used along with line commutation and controlled rectifier branches which are extinguishable, the current in the choke cannot fall below a certain minimum value if breaks in the d-c current are to be avoided.

In view of these limitations, in a converter controlled over its full range, the need for a universal apparatus useful in compensating reactive power and which permits a fast and continuous transition between an inductive and a capacitive reactive load becomes evident. Furthermore, there is a need for an efficient method of operating such an arrangement.

SUMMARY OF THE INVENTION

The present invention solves this problem by coupling two converters, designed as self-commutating converters, in parallel on the d-c side with the converters short-circuited through a common choke and with the one converter operated with a delayed firing time and the other with an advanced firing time. In addition, control means are provided to regulate the d-c current in the choke to a constant value by controlling the firing angles of the two converters in opposite directions.

In the apparatus of the present invention for compensating reactive power, the two converters are coupled in parallel on the d-c side and short-circuited through common choke. The magnitude of the d-c current in the choke is a function of the ratio of the maximum demanded reactive power to the no-load d-c voltage. The total d-c current in the choke is composed of the partial currents of the two converters and is regulated so that it maintains a constant value. Since one of the two converters is operated with a delayed firing time and the other with an advanced firing time, the share of the two partial currents and the constant total current in the choke can be varied by changing the firing angles of the two self-commutating converters in opposite directions. Thus, the apparatus of the present invention can operate as an adjustable inductive or capacitive reactive load. If both partial currents contribute one-half of the total d-c current in the choke, then the fundamental current on the line side is zero and the reactive load is zero.

The apparatus of the present invention is particularly well suited for compensating reactive power in a distribution network. In large power installations, a lower harmonic content of the line current can be insured through the use of a converter having a higher number of pulses i.e. a twelve pulse converter rather than a six pulse converter.

In accordance with the operating method for the apparatus of the present invention, the firing angle of one converter is controlled as a function of the reactive power in the three phase network which must be compensated and the firing angle of the other converter controlled to maintain a constant d-c current in the choke.

BRIEF DESCRIPTION OF THE DRAWINGS

FIG. 1 is a basic block diagram of the system of the present invention.

FIG. 2a is a waveform diagram illustrating inductive reactive power.

FIG. 2b is a waveform diagram illustrating zero reactive power.

FIG. 2c is a waveform diagram illustrating capacitive reactive power.

FIG. 3 is a more detailed block diagram of the system of FIG. 1 helpful in understanding the operating method of the present invention.

DETAILED DESCRIPTION OF THE PREFERRED EMBODIMENT

FIG. 1 shows a basic block diagram of the arrangement of the present invention. Shown are two self-commutating converters 1 and 2 having their a-c input coupled to an a-c line. This will typically be a three phase line having the voltage $\mu_N$. This voltage is coupled through a transformer 4 to the a-c inputs of the converters 1 and 2. Although single lines to the single transformer are shown on the figure for simplicity it will be recognized that a typical three phase connection will be provided. The converters 1 and 2 are converters which provide the same no-load d-c voltage. Their d-c outputs are coupled in parallel and are short-circuited through a common choke 3. In accordance with the present invention, the converter 1 is operated, for example, with a delayed firing time of approximately +90° and the converter 2 with an advanced firing time of approximately −90°. The converter having the advanced firing time is equipped with controlled rectifier branches which can be fired and extinguished making possible, for example, quenching in a phase sequence.

The manner in which the apparatus of the present invention operates can best be understood with reference to FIG. 2 which illustrates the wave shapes of the two partial currents $i_{N1}$ and $i_{N2}$ on the line side during one period of the a-c voltage compared to the line voltage and the total current $i_N$ on the line side. FIG. 2a illustrates these currents and voltages for an inductive reactive load, FIG. 2b for zero reactive load and FIG. 2c for a capacitive reactive load. From FIG. 2a it is evident that the converter 1, with the delayed firing, has a larger partial current $i_{N1}$ with the converter 2, having advanced firing, carrying a smaller partial current $i_{N2}$ of opposite polarity on the line side. The total current $i_N$ on the line side leads the line voltage $\mu_N$ by almost 90°. This means the consumption of inductive reactive power.

By decreasing the partial current $i_{N1}$ on the line side of the converter 1 while at the same time increasing the partial current $i_{N2}$ on the line side of the converter 2, the operating condition illustrated by FIG. 2b results. Now both of the partial currents $i_{N1}$ and $i_{N2}$ have the same magnitude but opposite polarity. Both partial currents are one half the d-c current $i_3$ impressed on the choke 3. As a result, the resulting current $i_N$ on the line side, and thus the reactive power is zero.

A further decrease of the partial current $i_{N1}$ on the line side of the converter 1 with a corresponding increase of the partial current on the $i_{N2}$ on the line side of the converter 2 results in the condition illustrated by FIG. 2c. Now the total current $i_N$ on the line side lags the line voltage $\mu_N$ by almost 90°. The converter is now consuming capacitive reactive power.

From the diagrams of FIGS. 2a, b and c it becomes evident that the present invention permits a continuous transition from an inductive to a capacitive reactive load. Since an impressed d-c current flows through the choke, the transition can readily be achieved by changing the partial currents in opposite directions by controlling the firing angles of the component converters. The d-c ripple in the choke need not be extremely small. In fact, it is sufficient to design the choke so that the break limit of the d-c current is at approximately one half the value of the nominal d-c current or even higher. As a result, the choke 3 remains small and has correspondingly low losses.

From the diagrams of FIG. 2a, b and c it is seen that the wave shape of the total current $i_N$ on the line side corresponds to the normal six pulse converter spectrum and does not change particularly with reactive load. If two twelve pulse converters are used instead, the choke can be designed to be even smaller in relation to the reactive power to be compensated. Such is particularly advantageous for installations of large power rating. The fundamental content of the current on the line side will then remain extremely high.

Since in practice the commutation of the converters is important and since the entire losses must be covered, the absolute values of the firing angles remain somewhat smaller than 90°. Furthermore, the d-c voltages of both converters have different wave shapes despite the fact that the mean value is nearly zero. As a result, a-c currents which do not flow through the choke 3 are superimposed on the d-c currents on the output side. These a-c currents can be limited effectively by stray inductances in the converter transformer if the short circuit voltage of this transformer is 20% or more.

FIG. 3 illustrates a more detailed block diagram of the system of FIG. 1 and is helpful in illustrating a preferred method of operating the apparatus according to the present invention. As is conventional, the converter 1 includes a power stage 1a, a control unit 1b which generates firing pulses for the controlled rectifiers in the power stage 1a and a control device 1c which provides a control input to the unit 1b. Similarly, the converter 2 is made up of the power stage 2a the control unit or firing pulse generator 2b and a control device or controller 2c. The control device 1c obtains its input from a measuring device 5 which measures the reactive power in the network. Control device 1c compares the measured value of the reactive power with a reference value which is internally set and delivers a corresponding control voltage to the control unit 1b which then generates proper firing pulses for the power stage 1a. Typically, the desired reactive power which is internally set can be adjusted in an attempt to achieve zero reactive power. A current transformer is coupled in a series with the choke 3. Its output provides a control input for the control device 2c. In that device, it is compared with a preset value establishing a desired current level. It will thus control the converter 2 to change the firing angles so as to maintain constant current in the choke 3. Thus, with reference to FIGS. 2a, b and c it becomes evident that if the converter is in the condition illustrated by FIG. 2a where it is acting as an inductive load and the load on the rest of the system changes so inductive compensation is not needed, the measuring device 5 will sense the fact that the reactive load is too high. This will result in the converter 1 being controlled so as to reduce its partial current $i_{N1}$. This reduction will be sensed by the current transformer 6, the output of which will then control the converter 2 in the opposite direction to increase its current. If no compensation is needed, this adjustment will take place until the system is in the condition illustrated by FIG. 2b. If capacitive compensation is needed, adjustment will continue until a state such as that illustrated by FIG. 2c is reached.

Thus an improved arrangement for compensating reactive power and a method of operating that arrangement has been shown. Although specific embodiments have been illustrated and described, it will be obvious to those skilled in the art that various modifications can be made without departing from the spirit of the invention which is intended to be limited solely by the appended claims.

What is claimed is:

1. Apparatus for compensating the reactive power in a three phase network comprising:
   a. a first converter operated with advanced firing time and having an a-c input coupled to the network and providing a d-c output;
   b. a second converter operated with delayed firing time and having the same no load d-c voltage as said first converter having its a-c input coupled to the network and having its d-c output coupled in parallel to the d-c output of said first converter;
   c. a common choke short-circuiting the outputs of said first and second converters; and
   d. means coupled to influence the operation of said first and second converters so as to maintain the d-c current in said choke constant.

2. Apparatus according to claim 1 wherein each of said converters includes a power section, a control unit for generating firing pulses and a control device for generating a control input for said control unit, said control device comparing an actual value with a predetermined desired value in order to develop its output and further including means to measure the reactive power in said network having its output coupled as the actual value input to the control device of said first converter and wherein said means for maintaining a constant d-c current in said choke comprises a current transformer coupled in series with said choke and providing its output as an actual value input to the control device associated with said second converter.

3. A method of operating apparatus for compensating the reactive power in a three phase network, the apparatus including first and second reactive power converters having the same no load voltages and having their a-c inputs coupled to the line and their d-c outputs coupled in parallel and short-circuited through a common choke comprising the steps of:
 a. operating the first converter with the delayed firing time;
 b. operating the second converter with an advanced firing time; and
 c. maintaining the d-c current in the choke at a constant value.

4. The method according to clam 3 wherein said d-c current is maintained at a constant value by influencing the firing angles of said first and second converters and opposite directions.

5. The method according to claim 3 and further including:
 a. controlling the firing angle of one of said converters as a function of the reactive power in the three phase network to be compensated; and
 b. controlling the firing angle of the other converter as a function of the d-c current in the choke.

* * * * *